United States Patent

[15] 3,649,338

Ishida

[45] Mar. 14, 1972

[54] GLASS FIBER REINFORCED THERMOSETTING RESIN COATING AND A METHOD FOR PRODUCING THE SAME

[72] Inventor: Masuo Ishida, Kobe, Japan

[73] Assignee: Kawasaki Steel Corporation, Kobe, Japan

[22] Filed: Sept. 2, 1969

[21] Appl. No.: 854,638

[30] Foreign Application Priority Data

Sept. 13, 1968 Japan............................43/65512

[52] U.S. Cl............117/97, 117/104 R, 117/126 GR, 117/161 K, 117/161 KP, 117/161 ZB, 260/37 EP, 260/40 R

[51] Int. Cl.............................B44d 1/08, B05b 13/06

[58] Field of Search...........117/97, 126 GR, 104 R, 104 B, 117/161 KP, 161 K, 161 ZB; 161/DIG. 4; 260/37 EP, 40 R

[56] References Cited

UNITED STATES PATENTS

| 3,071,162 | 1/1963 | Mick | 138/140 |
| 3,111,440 | 11/1963 | Prentice | 117/104 R X |
| 3,232,812 | 2/1966 | Lorentz et al. | 117/97 X |

Primary Examiner—Ralph S. Kendall
Assistant Examiner—Edward G. Whitby
Attorney—Robert E. Burns and Emmanuel J. Lobato

[57] ABSTRACT

A glass fiber reinforced thermosetting resin coating on substrate surface, such as the inner surface of a steel pipe, which coating consists of thermosetting resin and a reinforcing amount of glass fibers of sprayable length, and a method of forming such glass fiber reinforced thermosetting resin coating by spraying.

13 Claims, 4 Drawing Figures

GLASS FIBER REINFORCED THERMO-SETTING RESIN COATING AND A METHOD FOR PRODUCING THE SAME

This invention relates to a glass fiber reinforced thermosetting resin coating and a method for producing the coating, and more particularly to a glass fiber reinforced thermosetting resin coating formed on steel surface and a method for producing such coating by spraying.

In providing a coating of thermosetting resin on substrate surface, it has been often practised to laminate a glass fiber layer on the coating for reinforcement. According to a known method of such reinforcement, a glass fiber layer is formed by using woven glass fiber cloths, or by directly using comparatively long glass fibers of about 3 mm. or more in length. Such known method for forming a reinforced glass fiber layer is time-consuming. It has been impossible heretofore to provide a coating of thermosetting resin on a narrowly limited and difficultly accessible surface, such as the inner peripheral surface of tubes with a comparatively small diameter.

In other words, for applying a film of thermosetting resin onto a highly confined portion of an article, the aforesaid known method using comparatively long glass fibers is not practical.

It has been proposed to mix glass fibers with a thermosetting resin, such as polyester, and applying the mixture thus prepared onto a surface by spraying for producing a coating. Such spraying method, however, has drawback in that spraying nozzles tend to be clogged with the glass fibers, and continuous spraying cannot be effected for an extended period of time.

To facilitate continuous spraying of the mixture of the thermosetting resin and glass fibers, one may think of using glass fibers which are short enough to pass through the spraying nozzle without causing any clogging. Such continuous spraying has not been practised, because short glass fibers suitable for the spraying were not available on the one hand, and there has been no urgent demand for products made by such continuous spraying process on the other hand. In short, there has not been any effective method for the simultaneous spraying of thermosetting resin and glass fiber.

Therefore, an object of the present invention is to provide a novel practical method of forming a glass fiber reinforced thermosetting resin coating on the surface of steel sheets, steel pipes, etc., by spraying, which obviates the aforesaid difficulties of known methods. The method according to the present invention is particularly useful, for instance, in providing a coating of reinforced thermosetting resin onto very narrowly limited surface, such as the inner surface of a small diameter tube.

The inventor has found that satisfactory reinforcing effects can be achieved when a coating of thermosetting resin is sprayed in the following manner together with glass fibers. At first, substrate surface, which is to be coated, is preferably cleansed, degreased, and provided with a primer layer. A mixture is separately prepared which consists of a suitable amount of short glass fibers and a thermosetting resin. It is possible to add one or more auxiliary ingredients, e.g., a pigment, aggregates, a catalyzer, and a gelling agent. The mixture thus prepared is sprayed onto the aforesaid substrate surface for producing the desired glass fiber reinforced thermosetting resin coating.

For a better understanding of the invention, reference is made to the accompanying drawings, in which.

The invention will now be described in detail, step by step. By cleansing and degreasing substrate surface and by applying a primer layer thereon, the substrate surface is made rustproof and the adhesiveness of the surface to a coating is improved. After a glass fiber reinforced thermosetting resin coating is applied, the primer layer on the degreased surface acts as a cushion which absorbs the strain caused by the difference of coefficient of thermal expansion between the substrate, such as steel pipe, and the coating made of thermosetting resin. According to the present invention, however, such steps of cleansing, degreasing, and applying a primer layer can be dispensed with, if so desired.

The thermosetting resin usable in the present invention can be any resins which have thermosetting properties. Some examples of such thermosetting resins are polyester, epoxy resin, and polyurethane.

The length of glass fibers to be added in the thermosetting resin for the purpose of reinforcement, according to the present invention, should be determined by tests for each application, so as to meet all the specific conditions for the application; namely, fulfilling the reinforcing function in the thermosetting resin, being sprayable by a spray gun through a nozzle, and providing satisfactory surface texture.

In case of commercially available glass fibers of 7 micron dia., if each fiber is extremely short, e.g., shorter than 15 microns, the fibers are not entwined with each other however great quantity of it is added into the thermosetting resin. As a result, such too short glass fibers do not contribute to the reinforcement of the resin.

On the other hand, if the individual glass fibers are too long, for instance several hundred microns long, spray nozzles are easily clogged by the glass fibers to hamper smooth spraying operation. Furthermore, such long glass fibers become fluffy in the thermosetting resin to roughen the coated surface. Besides, when the glass fibers are too long, the dispersibility of the glass fibers in the thermosetting resin is reduced, and such long glass fibers added in the thermosetting resin tend to aggregate by themselves in a pot before spraying and to form bulky lumps in the resin.

Figure 1:
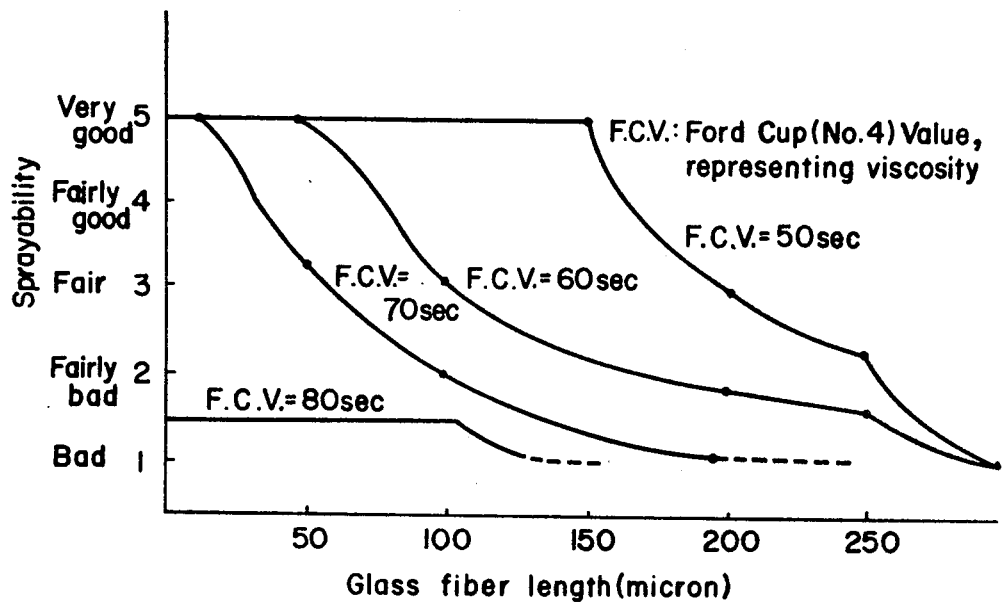
FIG. 1 is a graph showing the relation between the length of glass fibers to be added in a spraying mixture and the sprayability of the mixture.

FIG. 1 shows the relation between the length of glass fibers to be added in the spraying mixture and the sprayability of the mixture, for the case of the mixtures which consist of polyester acting as the thermosetting resin and 20 percent of glass fibers of 7 micron dia. It is apparent from FIG. 1 that the length of glass fibers should preferably be less than 200 microns, although somewhat longer glass fibers can be used with other thermosetting resins at different concentrations.

The inventor has confirmed by experiment that as the content of glass fibers in the spraying mixture increases, the curves of FIG. 1 move toward left. For instance, if 35 percent of glass fibers are added, the length of the glass fibers should preferably be less than 100 microns for ensuring satisfactory sprayability of the mixture (see FIG. 3).

The amount of glass fibers, which are to be added in the thermosetting resin, should also be controlled. If the quantity of the glass fibers in the resin is too small, individual glass fibers are not entwined with each other, even when the glass fibers are very long, e.g., several hundred microns long. Thus, with such a small quantity of glass fibers, satisfactory reinforcing effects cannot be achieved.

Figure 2:
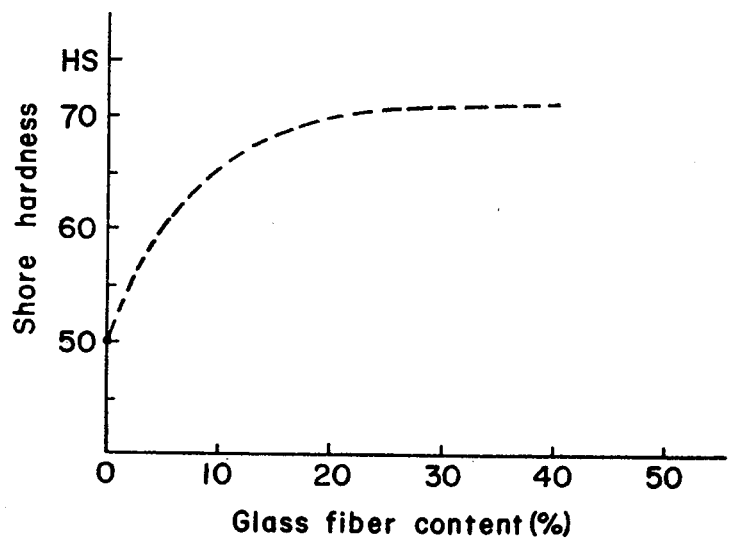
FIG. 2 is a graph illustrating the relation between the amount of glass fibers added in the spraying mixture and the hardness of a glass fiber reinforced thermosetting resin coating which is formed by spraying the mixture on substrate.

Referring to FIG. 2, which shows the relation between the amount of glass fibers to be added in the spraying mixture and the Shore hardness of a coating made by the mixture, it is apparent that at least 10 percent of glass fibers should preferably be added in order to achieve satisfactory hardness of the coating. The data of FIG. 2 were obtained by adding 50 microns long glass fibers of 7 microns dia. in liquid polyester to prepare spraying mixtures, and spraying the mixture on 1.6 mm. thick steel sheets for forming 0.7 mm. thick coatings.

On the other hand, when too much glass fibers are added into the thermosetting resin, the mechanical strength of the resin is deteriorated, and the viscosity of the mixture of the resin and the glass fiber is increased, regardless of the length of the glass fiber used, so that the workability of the mixture is impaired.

Figure 3:
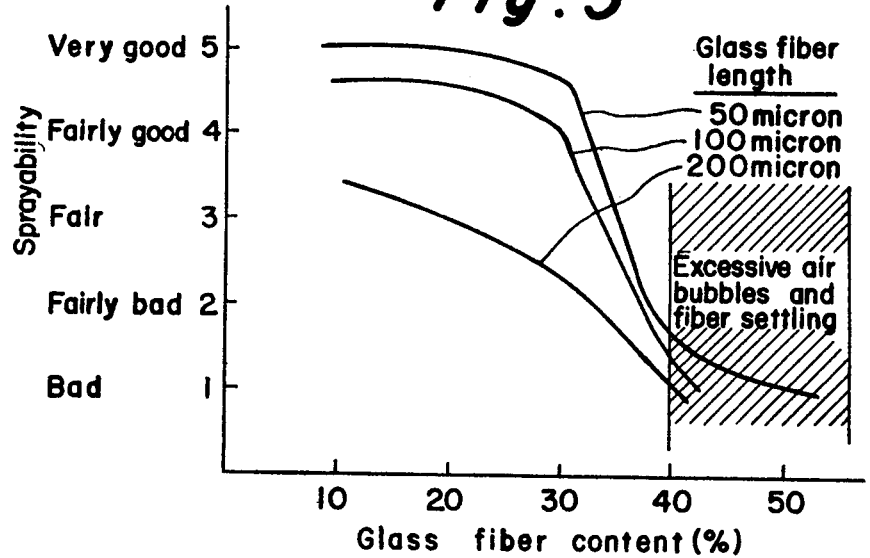
FIG. 3 is a graph showing the relation between the amount of glass fibers added in the spraying mixture and the sprayability of the mixture.

FIG. 3 shows the relation between the amount of glass fibers to be added in the spraying mixture and the sprayability of the mixture, for the case of mixtures comprised of polyester acting as a thermosetting resin and 7 microns dia. glass fibers of 50, 100, and 200 microns in length. The viscosity of the mixtures, as determined by Ford Cup No. 4, is adjusted between 50 and 60 seconds. If 40 percent or more of glass fibers is added in the mixture, air bubbles entrapped in small spaces defined by adjacent glass fibers cannot readily be removed. Besides, the glass fibers tend to settle in the solution. Thus, with such excessive amount of glass fibers, spraying cannot be effected satisfactorily. In the spraying mixtures of FIGS. 2 and 3, 10 to 40 percent of glass fibers are added to liquid polyester.

The diameter of glass fibers usable in the present invention is generally restricted to 5 to 15 microns by manufacturing limitations.

The thickness of a coating, which is to be made by spraying according to the present invention, must be thicker than 0.05 mm. but thinner than 1 mm., because any coating thinner than 0.05 mm. does not have the desired reinforcing effects, while the increase of the coating thickness in excess of 1 mm. causes various detrimental effects without improving the reinforcing effects.

In a preferred embodiment of the present invention, it is possible to add into thermosetting resin one or more of suitable auxiliary ingredients, such as a pigment of selected color, a catalyzer, a viscosity-adjusting agent, a gelling agent, and aggregates, such as titanium white and asbestos, together with the glass fibers. The kind of the catalyzer, viscosity-adjusting agent and gelling agent, to be used in the spraying mixture, depends on the kind of the resin used. If the spraying operation can be completed in very short period of time, the aforesaid one or more auxiliary ingredients can be mixed with the thermosetting resin prior to the beginning of the spraying operation. If the spraying operation is expected to last long, the mixture containing such auxiliary ingredients may be hardened in a pot before being sprayed. In order to avoid such prespraying hardening, it is preferable to use a pair of spray guns; namely, one spraying gun connected to a pot containing a mixture without the gelling agent, and one spraying gun connected to a pot containing a mixture without the catalyzer, so that the two mixtures in the pair of pots can simultaneously be applied to the substrate surface by the two spraying guns for effecting the mixing of the gelling agent and the catalyzer into the coating during the solidifying process of the coating on the substrate surface.

As described in the foregoing, according to the present invention, there is provided a novel method of applying a coating of glass fiber reinforced thermosetting resin onto a substrate surface, e.g., steel surface, by spraying a mixture consisting of the thermosetting resin and a suitable quantity of very short glass fibers. The method according to the present invention can be used in applying the coating of glass fiber reinforced thermosetting resin onto very narrowly limited surface, such as the inner surface of a small diameter steel pipe.

Articles which have the coating of glass fiber reinforced thermosetting resin according to the present invention are provided with not only properties peculiar to the substrate of the articles per se, but also excellent performance characteristics of the thermosetting resin, such as outstandingly high values of chemical stability, abrasion resistance, heat resistance, and cold resistance.

Figure 4:
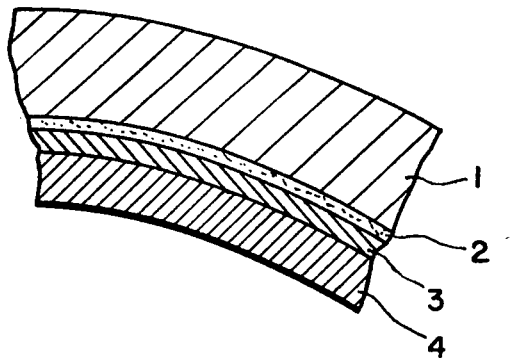
FIG. 4 is a partial sectional view of a steel pipe whose inner surface is provided with a glass fiber reinforced thermosetting resin coating, according to the present invention.

In FIG. 4, the inner surface of a steel pipe 1 is degreased and subjected to chemical conversion treatment to form a conversion coating 2 thereon. A primer layer 3 is provided on the conversion coating 2, and then a desired coating 4 of glass fiber reinforced thermosetting resin is formed on the primer layer 3 by spraying a mixture as described hereinafter. The mixture to be sprayed for producing the glass fiber reinforced thermosetting resin coating 4 consists of a thermosetting resin and a suitable quantity of very short glass fibers, which are preferably 15 to 300 microns long. With such mixture of short glass fibers and thermosetting resin, the glass fiber reinforced thermosetting resin coating 4 can be formed much easier than by any other known methods which use about 3 mm. long glass fibers. More particularly, the use of such very short glass fibers enables the spraying of the mixture, which is a highly simplified process for applying such coating on substrate surface. If long glass fibers, such as 3 mm. long fibers, are used, it is impossible to use the spraying process, because the long glass fibers tend to clog or plug spray nozzles, as pointed out in the foregoing.

Thus, with the method according to the present invention, the process of producing a glass fiber reinforced thermosetting resin coating is greatly simplified.

It should be noted here that with the introduction of the spraying process, the glass fiber reinforced thermosetting resin coating can now be provided on any narrowly confined surface, such as the inner surface of very small diameter. Without the use of spraying, application of such glass fiber reinforced thermosetting resin coating is almost impossible. In other words, satisfactory formation of the aforesaid coating can hardly be effected by brushing.

Furthermore, the aforesaid construction of the coating on the inner surface of the steel pipe 1, which includes the conversion coating 2, the primer layer 3, and the glass fiber reinforced thermosetting resin coating 4, provides greatly improved performance characteristics to the steel pipe as compared with pipes with known coating, such as steel pipes with vinyl chloride coating. For instance, the steel pipe 1 of the figure is much better than any known steel pipe with vinyl chloride coating in heat resistance, cold resistance, and shock resistance. Furthermore, the steel pipe 1, which is coated by the method of the present invention, is much cheaper than the known steel pipe with similar coating, because the coating process is considerably simplified.

The mixture to be used in the method of the present invention will now be described in further detail, by referring to examples.

EXAMPLE 1

The inner surface of a steel pipe was thoroughly cleansed and provided with a primer layer. Separately, a mixture was prepared which was comprised of 50 percent of polyester, 15 percent of 20 to 30 microns long glass fibers, and the remainder consisting of a pigment and aggregates. The mixture was applied onto the primer layer on the thus cleansed inner surface of the steel pipe by spraying in order to form a 0.7 mm. thick coating. The glass fiber reinforced thermosetting resin coating thus formed had excellent adherence to the steel pipe. The chemical resistance and the heat resistance of the resin coating proved to be excellent.

EXAMPLE 2

The inner surface of a steel pipe with a 100 mm. inside diameter was thoroughly cleansed and provided with a primer layer. Separately, a spraying mixture was prepared by adding 20 percent of 50 microns long glass fibers in liquid polyester. The viscosity of the spraying mixture, as measured by Ford Cup No. 4, was adjusted at 50 seconds, by using styrene monomer. A 0.5 mm. thick glass fiber reinforced polyester coating was formed on the inner surface of the steel pipe.

The spraying was carried out smoothly, and the Shore hardness of the coating on the inner surface of the steel pipe proved to be 70°.

EXAMPLE 3

A steel plate was cleansed, and its surface was treated by zinc phosphatizing, and a primer layer was applied thereon.

Separately, a composition was prepared which was comprised of 30 percent of 30 to 100 microns long glass fibers, 45 percent of polyurethane, and the remainder consisting of a pigment and aggregates. By adding VMCP naphtha, the viscosity of the composition was adjusted at 100–110 seconds, as measured by Ford Cup No. 4. The composition with the adjusted viscosity was applied onto the steel plate surface by spraying to form a 0.67 to 0.70 mm. thick glass fiber reinforced polyurethane coating.

The spraying was carried out very smoothly, and the adherence of the resin coating with the steel plate was excellent. The shock resistance and the hardness of the resin coated steel plate proved to be excellent.

EXAMPLE 4

The inside surface of a steel pipe of 50 mm. dia. was cleansed and subjected to zinc phosphatizing treatment. Separately, a composition was prepared, which consisted of 50 percent of epoxy resin and 50 percent of 200 to 300 microns long glass fibers. Acetone was added into the composition until the viscosity of the acetone solution of the composition became 50 seconds, as determined by Ford Cup No. 4. The solution of the composition was sprayed onto the inner surface of the steel pipe to form a 0.55 to 0.60 mm. thick glass reinforced epoxy resin coating. The resin coating proved to be very tough and have excellent heat resistance and chemical resistance.

EXAMPLE 5

The surface of a 1.6 mm. thick steel sheet was thoroughly cleansed and provided with a primer layer. Separately, a spraying mixture was prepared by adding 10 percent of 200 micron long glass fibers in liquid polyester. The viscosity of the mixture, as measured by Ford Cup No. 4, was adjusted at 50 seconds, by adding styrene monomer, and then dyed in blue by adding phthalocyanic blue. A 0.7 mm. thick glass fiber reinforced polyester coating was formed on the steel sheet by spraying the mixture.

The spraying process was carried out smoothly. The Shore hardness of the coating thus formed proved to be 67°. The coated steel sheet was bent with a radius of curvature, which was three times the thickness of the sheet. It was proved that no cracking and peeling of the coating occurred until the bending angle increased to 15° or more.

EXAMPLE 6

The inner surface of a steel pipe with a 30 mm. inside diameter was cleansed and provided with a primer layer. Separately, a spraying mixture was prepared by adding 35 percent of 50 microns long glass fibers in liquid polyester. The viscosity of the mixture, as determined by Ford Cup No. 4, was adjusted at 60 seconds, by adding styrene monomer. A 0.7 mm. thick glass fiber reinforced polyester coating was formed on the steel sheet by spraying the mixture thereon.

The spraying process was carried out smoothly, and the surface of the coating proved to be sleek.

Although the present invention has been described by referring to preferred embodiment, it should be understood that numerous changes and modifications are possible without departing from the scope of the invention, as hereinafter claimed.

I claim:

1. A method for producing a glass fiber reinforced thermosetting resin coating on a substrate surface, comprising preparing a liquid mixture comprising a thermosetting resin, and a reinforcing amount of glass fibers of sprayable length, in the range of from 15 to 300 microns in length and spraying the liquid mixture onto the substrate surface.

2. A glass fiber reinforced thermosetting resin coating on a substrate surface, which comprises a thermosetting resin, a reinforcing amount of glass fibers of sprayable length, in the range of from 15 to 300 microns in length said coating being formed on said substrate surface by spraying a liquid mixture of the same thereon.

3. A method for producing a glass fiber reinforced thermosetting resin coating on a substrate surface, comprising preparing a liquid mixture comprising a thermosetting resin, and a reinforcing amount of from 10 to 40 percent of glass fibers of sprayable length, in the range of from 15 to 300 microns in length and spraying in liquid mixture onto the substrate surface.

4. A glass fiber reinforced thermosetting resin coating on a substrate surface which comprises a thermosetting resin, a reinforcing amount of from 10 to 40 percent of glass fibers of sprayable length, in the range of from 15 to 300 microns in length said coating being formed on said substrate surface by spraying a liquid mixture of the same thereon.

5. A method according to claim 1, characterized in that said thermosetting resin is selected from the group consisting of polyester, polyurethane, and epoxy.

6. A glass fiber reinforced thermosetting resin coating according to claim 2, wherein said thermosetting resin is selected from the group consisting of polyester, polyurethane, and epoxy.

7. A method according to claim 1, characterized in that said liquid mixture is made by adding 10 to 40 percent of glass fibers in liquid polyester, the length of said glass fibers being 15 to 200 microns, the viscosity of said liquid mixture, as determined by Ford Cup No. 4, being less than 70 seconds.

8. A glass fiber reinforced thermosetting resin coating according to claim 2, characterized in that said thermosetting resin is polyester, and said glass fibers are 15 to 200 micron long and contained at a rate of 10 to 40 percent.

9. A steel pipe having a coating on an inner surface thereof, said coating consisting of a glass fiber reinforced thermosetting resin coating which contains thermosetting resin and reinforcing amount of 15 to 300 micron long glass fibers.

10. A steel pipe according to claim 9, characterized in that said thermosetting resin is polyester, and said glass fibers are 15 to 200 microns in length and contained at a rate of 10 to 40 percent.

11. A steel pipe according to claim 9, wherein said glass fiber reinforced thermosetting resin coating is 0.05 to 1 mm. thick.

12. A method for lining an inner surface of a steel pipe, comprising cleansing the inner surface, spraying on the inner surface a liquid mixture so as to deposit a resin layer, said liquid mixture consisting of thermosetting resin and a reinforcing amount of 15 to 300 microns long glass fibers, and heating said layer thus applied on said inner surface.

13. A method for lining an inner surface of a steel pipe, according to claim 12, characterized in that said liquid mixture is made by adding 10 to 40 percent of 15 to 200 microns long glass fibers in liquid polyester, the viscosity of said liquid mixture, as determined by Ford Cup No. 4, being less than 70 seconds.

* * * * *